United States Patent
Linton et al.

(10) Patent No.: US 11,755,981 B2
(45) Date of Patent: Sep. 12, 2023

(54) PEER REVIEW SYSTEM WITH POLYNOMIAL DISCOUNTING

(71) Applicant: International Business Machines Corporation, Armonk, NY (US)

(72) Inventors: Jeb R. Linton, Manassas, VA (US); David K. Wright, Monroe, MI (US); Michael Amisano, East Northport, NY (US); John Melchionne, Kingston, NY (US); John Behnken, Hurley, NY (US); Dennis Kramer, Siler City, NC (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 17/321,567

(22) Filed: May 17, 2021

(65) Prior Publication Data
US 2022/0366349 A1    Nov. 17, 2022

(51) Int. Cl.
  *G06Q 10/0639*   (2023.01)
  *G07C 13/00*     (2006.01)
  *H04N 21/475*    (2011.01)

(52) U.S. Cl.
  CPC ....... *G06Q 10/06398* (2013.01); *G07C 13/00* (2013.01); *H04N 21/4758* (2013.01); *H04N 21/4756* (2013.01)

(58) Field of Classification Search
  CPC ............................................. G06Q 10/06398
  See application file for complete search history.

(56) References Cited

U.S. PATENT DOCUMENTS

| | | | |
|---|---|---|---|
| 6,334,132 B1 * | 12/2001 | Weeks | G06F 16/345 |
| | | | 707/723 |
| 10,783,539 B2 | 9/2020 | Frank | |
| 2011/0040759 A1 * | 2/2011 | Rappoport | G06F 16/3347 |
| | | | 707/E17.089 |

(Continued)

FOREIGN PATENT DOCUMENTS

| | | |
|---|---|---|
| CN | 10569294 A | 12/2019 |
| CN | 106453286 A | 3/2020 |
| CN | 111314428 A | 6/2020 |

(Continued)

OTHER PUBLICATIONS

"The ESCO ontology", downloaded from the internet on Jan. 6, 2021, 39 pages, <https://ec.europa.eu/esco/resources/data/static/model/html/model.xhtml>.

(Continued)

*Primary Examiner* — Hsinchun Liao
(74) *Attorney, Agent, or Firm* — David B. Woycechowsky

(57) ABSTRACT

Technology for voting, or endorsing with votes, a set of subjects under review, such as a group of human individual peers or a set of products. Each voter in this system is provided with an amount of voting credits that may be allocated among and between at least some of the subjects under review. In some embodiments a discounting scheme is applied to the voting credit allocations so that multiple credits allocated to a single subject will typically count for fewer net "votes" for the subject as the number of credits allocated to that single subject increases. In some embodiments, the discounting scheme is polynomial voting.

18 Claims, 4 Drawing Sheets

(56) References Cited

U.S. PATENT DOCUMENTS

2011/0202464 A1\* 8/2011 Carbullido ............ H04L 9/3242
  705/50
2018/0069849 A1 3/2018 Kraemer

FOREIGN PATENT DOCUMENTS

CN 110020541 B 11/2020
WO 2020229950 A1 11/2020

OTHER PUBLICATIONS

Bellini, et al., "Blockchain-Based Distributed Trust and Reputation Management Systems: A Survey", accepted Jan. 20, 2020, date of publication Jan. 27, 2020, date of current version Feb. 4, 2020, Digital Object Identifier 10.1109/ACCESS.2020.2969820, vol. 8, 2020, pp. 21127-21151.

Liu, et al., "Reliable Interoperation of Demand Response Entities Considering Reputation Based on Blockchain", IEEJ Transactions on Electrical and Electronic Engineering, IEEJ Trans 2020; 15: 108-120, Published online in Wiley Online Library (wileyonlinelibrary.com), DOI:10.1002/tee.23032.

\* cited by examiner

THE MOVIE REVIEW SITE

| YEAR | MOVIE | TOTAL VOTING CREDITS | VOTES AFTER DISCOUNT |
|------|-------|----------------------|----------------------|
| 1972 | THE FROGMAN COMETH | 10 | 10 |
| 2019 | PUTTING GREEN STORY | 30 | 20 |
| 2008 | ROMEO'S GOLDEN COMB | 60 | 30 |
| 1948 | WINTERGREEN LOVE MYTH | 100 | 40 |
| 1902 | A TRIP TO THE MOON | 200 | 58.33 |

SITE RULES FOR PUBLIC VOTING

1. ONE DOLLAR PER VOTING CREDIT. EACH ACCOUNT HAS A 400 CREDIT MAXIMUM PER YEAR.
2. FIRST TEN VOTES FOR A MOVIE ARE ONE CREDIT PER VOTE. SECOND TEN VOTES FOR A MOVIE ARE TWO CREDITS PER VOTE. THIRD TEN VOTES FOR A MOVIE ARE THREE CREDITS PER VOTE. AND SO ON.
3. AN ACCOUNT MAY SPEND NO MORE THAN 200 CREDITS ON A SINGLE MOVIE

LOG IN     NEW ACCOUNT

FIG. 4

PEER REVIEW SYSTEM WITH POLYNOMIAL DISCOUNTING

BACKGROUND

The present invention relates generally to the field of peer review systems (for example, peer recommendation systems) and also to the technique of polynomial discounting.

Peer review systems are known. In these systems, "peers" review a person, a thing (for example, a book) or a series of transactions (for example, a lecture series). The reviews may be positive (for example, endorsements) or negative (for example, complaints) or somewhere in-between. The reviews may be numerically based (for example, eight stars out of ten) or based on narrative text (for example, "Linda is a great researcher in the field of dung beetles"). What makes a peer review system different than a regular review system is that the reviewers are, at least for the most part, peers of the person(s) being reviewed, or peers of the person(s) who created the thing being reviewed. For example, peers of an author of a new novel that just published might variously be considered as other widely published authors, or other authors who had published novels, or other authors who published novels in the same genre. It is known that peer review systems can be implemented on computers and over computer networks, like the internet. It is known that peer review systems may be used for objectives including the following: determining new employment hires, deciding employment raises, deciding employment promotions, acceptance at schools and honorary positions (for example, a Hall Of Fame).

Polynomial discounted voting is a voting system where there is a mathematical relationship that can be expressed as a polynomial equation between: (i) an amount of voting credit that is expended on a single subject entity (or subject under review); and (ii) the effective value of the expended voting credits that were expended on the subject under review.

The concept of limited credit is a value that comes as a result of endorsements that continually replenishes at a defined rate determined by your level of peer endorsement.

The concept of enforced anonymity is where there is no record of an individual's result that can be shared with another party.

SUMMARY

According to an aspect of the present invention, there is a method, computer program product and/or system that performs the following operations (not necessarily in the following order): (i) receiving a subject matter data set that includes an identification of a plurality of subjects under review; (ii) allocating N voting credits to a first user, where N is a positive number; (iii) receiving, from the first user, a vote allocation that divides at least a portion of the N voting credits among and between at least some of the subjects under review in amounts specified in the vote allocation; and (iv) applying the vote allocation to the at least some of the subjects under review to obtain current vote rankings for the plurality of subjects under review.

BRIEF DESCRIPTION OF THE DRAWINGS

FIG. 4 is a screenshot view generated by the first embodiment system; and

DETAILED DESCRIPTION

Figure 1:
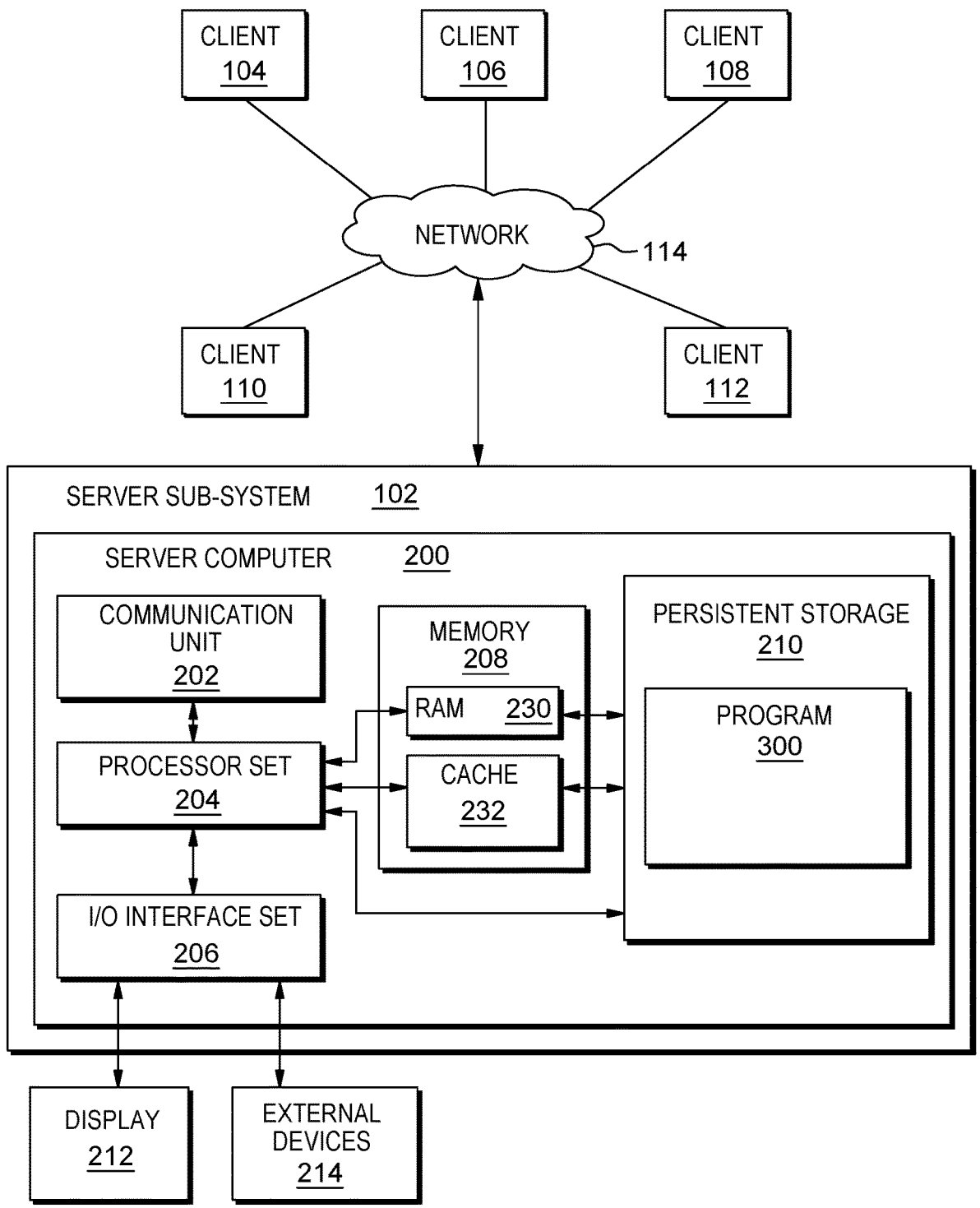
FIG. 1 is a block diagram view of a first embodiment of a system according to the present invention.

Some embodiments of the present invention are directed to a computerized peer review system where enforced anonymity and polynomial discounting disincentivizes bad faith endorsements because individual endorsements are discounted which reduces reviewer tendencies toward virtue signaling. More specifically, virtue signaling is rendered ineffective because nobody knows who gave which peer review. Further, again because nobody knows the identities of the various authors of the various peer endorsements and/or numerical ratings this means there is reduced incentive to endorse a certain way based on who might be watching. In some embodiments, limited credit incentivizes peers to use their endorsements on what each respective peer really cares about.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
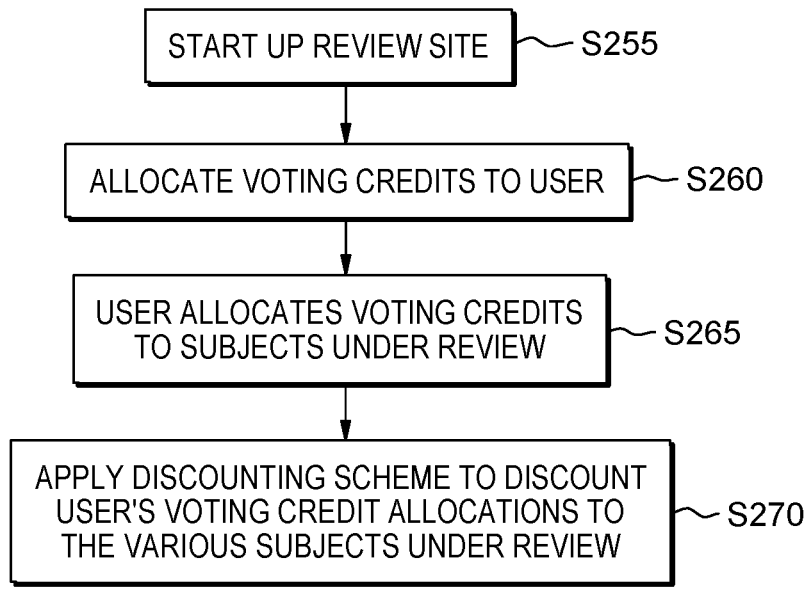
FIG. 2 is a flowchart showing a first embodiment method performed, at least in part, by the first embodiment system.
Figure 3:
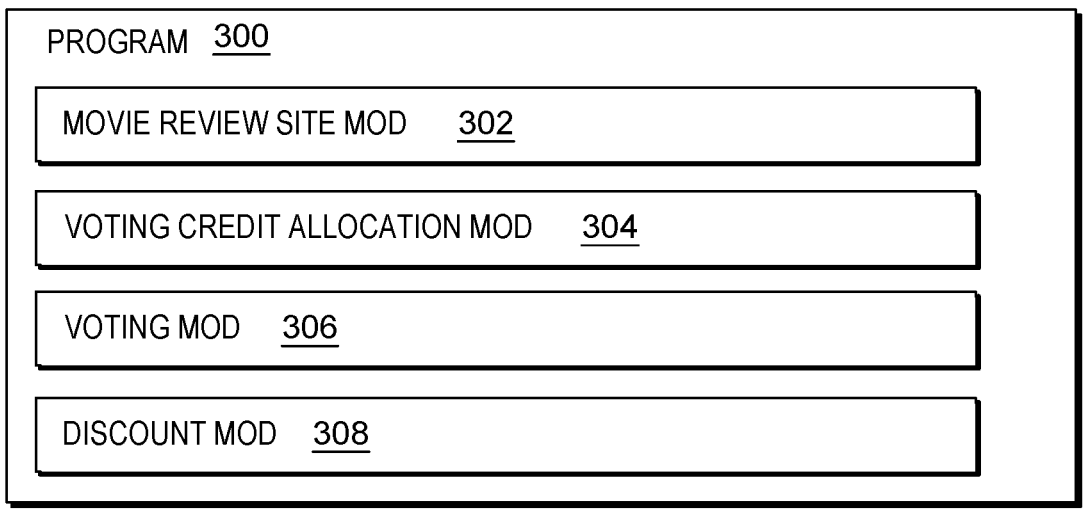
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where movie review site module ("mod") 302 serves a movie review site (see screenshot 400 of FIG. 4) to the public. In this example, client subsystems 104, 106, 108, 110, 112 are computers and/or smart phones used and controlled by various members of the public. As shown in screenshot 400, the Movie Review Site in this simple example exists to rank five (5) movies relative to each other. The rankings are determined by a "discounted vote" value for each movie, as will be explained in more detail in the following paragraphs. In this example, when operation S255 initially starts being performed, there are no votes, and no discounted votes, for any of the five movies that are to be ranked by members of the public. As discussion proceeds through subsequent operations, a single voter (specifically John Doe, the user of client subsystem 104) will obtain voting credits and cast votes using the voting credits to demonstrate one way in which the discounted voting of the present invention can work. While operation S255 is shown as a single discrete block arranged in series with the other operations of flowchart 250, it should be understood that the web site will continue to serve up the Movie Review Site to various members of the public who visit the site, even as John Doe is obtaining and casting his votes in the subsequent operations of flowchart 250.

Processing proceeds to operation S260, where user John Doe (effectively, client subsystem 104) obtains 400 voting credits by communicating, through network 114, with voting credit allocation mod 304. In this example, and as shown in screenshot 400: (i) the voting credits cost $1.00 per voting credit (so John Doe pays $400.00 for the 400 voting credits); and (ii) the 400 credits are all that John Doe can buy for the entire year. Alternatively and/or additionally, voting credits can be allocated to voters in different ways, such as being given for free, being awarded to experts and/or influencers in amounts reflecting degree of expertise/influence, etc.

In this embodiment, the "subjects" being ranked are products/services (specifically movies). Alternatively, and as discussed in the next sub-section of this Detailed description section, the subjects could be individual people and/or enterprises (for example, a group of peers in a common field of endeavor). In this embodiment, the set of subjects to be voted upon and ranked is predetermined and remains fixed over time as more and more people obtain voting credits and then use those credits to place votes. Alternatively, subjects for review could be added/deleted at the option of the provider of the Movie Review Site and/or its users.

Processing proceeds to operation S265, where John Doe (that is, client subsystem 104) communicates with voting mod 306 to vote for the various movies by spending voting credits on them in at least rough proportion to how favorably John Doe is disposed toward the various movies of the movies available for review (again, just five (5) movies in this simple example). More specifically, John Doe spends his voting credits as follows: (i) The Frogman Cometh gets 10 credits; (ii) Putting Green Story gets 30 credits; (iii) Romeo's Golden Comb gets 60 credits; (iv) Wintergreen Love Myth gets 100 credits; and (iv) A Trip To The Moon gets 200 credits (which is the maximum that John Doe can give a single movie under the rules in this simple example).

Processing proceeds to operation S270, where discount mod 308 discounts the votes according to a discounting scheme to obtain a discounted votes value for each movie. In this simple example, only John Doe's votes need to be discounted because he is the only person who has voted at the time that operation S275 is performed. Before moving to a discussion of the discount scheme being used in this particular example, the phrase "discount scheme" will hereby be defined as: any set of mathematical rules and/or function(s) for converting voting credits into votes in a manner so that the amount of discounted votes for a subject under review is at least sometimes less than a corresponding number of voting credits spent to vote for the subject under review.

In this simple example, the specific discount scheme applied by mod 308 is as follows: (i) the first ten votes for a given movie cost one credit apiece (zero discount at this low level of vote quantity); (ii) the next ten votes for a given movie cost two credits apiece (for example, 11 votes for a given movie costs 12 credits); (iii) the next ten votes for a given movie cost three credits apiece (for example, 21 votes for a given movie costs 33 credits); (iv) the next ten votes for a given movie cost four credits apiece (for example, 31 votes for a given movie costs 64 credits); (v) the next ten votes for a given movie cost five credits apiece (for example, 51 votes for a given movie costs 105 credits); and (vi) the next ten votes for a given movie cost six credits apiece. Screenshot 400 shows how John Doe's various expenditures of voting credits have been converted into discounted vote values for each movie.

A note on the terminology will now be made. Notice that the 10 voting credits that John Doe used to vote for The Frogman Cometh are not discounted—it is one credit equals one net vote for these particular ten credits. The same can be said of the first ten (10) credits that John Doe allocated toward each of the other four (4) movies. While these votes are not discounted, they are subject to a "discount scheme" where at least some of the voting credits will be discounted (as are, say, the second ten (1) credits that John Doe allocated to Putting Green Story. The embodiment currently under discussion does not necessarily discount every vote, but it does subject every vote to a discounting scheme, where, in many cases, at least some of the votes will be discounted. Even polynomial voting embodiments (discussed, below, in the next sub-section of this Detailed Description section) typically do not discount the first voting credit applied toward a given subject of review, but it does apply all voting credit allocations to a discounting scheme.

Alternatively, other kinds of discounting schemes may be used, such as polynomial voting. The discount scheme described in the previous paragraph is a step function. Alternatively, the discounting functions could be continuous, like they are in polynomial voting schemes.

Some embodiments of the present invention may not apply any discounting scheme when people vote upon subjects under review. However, these embodiments will not provide certain advantages of a well-chosen discounting scheme, such as fairness in the voting. The advantages of discounting schemes in connection with the present invention will be further discussed in connection with the polynomial voting embodiments discussed, below, in the next sub-section of this Detailed Description section.

III. Further Comments and/or Embodiments

Some embodiments of the present invention are directed to systems of privacy-preserving polynomial discounted multidisciplinary reputation and voting, where the system includes: (i) a reputation ledger configured to store reputation-influencing transactions relating to individuals, wherein the reputation-influencing transactions include professional degrees, technical competency, expertise, and social scores; (ii) an evaluation component configured to grant voting points to the individuals based on their respective reputation-influencing transactions; and (iii) a privacy-preserving voting mechanism configured to provide polynomial voting for the individuals assigned with the voting points and based on a given field.

Some embodiments of the present invention may include one, or more, of the following operations, features, characteristics and/or advantages: (i) the reputation ledger is a permissioned blockchain ledger; (ii) in a blockchain ledger, endorsement-granting institutions record privacy-preserving endorsements using an existing public key infrastructure of the reputation ledger; (iii) the reputation ledger is in the form of a distributed hash table; (iv) voting points can be adjusted based on changes to the reputation-influencing transactions; (v) a reputation system that is general purpose in nature and not specific to cryptocurrency miners; and/or (vii) is a reputation system that is general purpose in nature and not specific to blockchain nodes.

Some embodiments of the present invention recognize the following facts, potential problems and/or potential areas for improvement with respect to the current state of the art: (i) in the world of "fake news" and questionable quality of information sources online, it would be valuable to have a well-designed system of reputation for experts in various fields of knowledge; and/or (ii) market design economists have invented a system of voting known as polynomial voting, which overcomes many of the perverse incentives inherent to one-man-one-vote systems as well as those where one's money or power directly determines one's influence.

Some embodiments of the present invention may include one, or more, of the following operations, features, characteristics and/or advantages: (i) adapts the polynomial voting concept to create a system of reputation across many disciplines; (ii) is rooted in degree and certificate-granting institutions; (iii) is rooted in a privacy-preserving identity system of un-linkable credentials such as Hyperledger Fabric Identity Mixer; and/or (iv) uses a blockchain as an immutable but privacy-preserving decentralized ledger of reputation transactions.

Some embodiments of the present invention may include one, or more, of the following operations, features, characteristics and/or advantages: (i) describes a system for establishing and reliably managing measurement of professional expertise and knowledge through decentralized privacy-preserving cryptographic mechanisms; (ii) uses a designed market that builds upon the concept of polynomial voting; (iii) creates a widely distributed social network of reputation based on personal endorsements; (iv) uses a polynomial-computed reputation credit as the foundation of a polynomial voting system for many potential purposes; (v) relies on a hierarchical ontology of professions, disciplines, and fields of expertise; and/or (vi) relies on an existing ontology that defines, and puts into hierarchical structures, skills, competences, qualifications and occupations and the like.

Some embodiments of the present invention may include one, or more, of the following operations, features, characteristics and/or advantages: (i) the initial root of reputation in the system would be based on: (a) cryptographic credentials granted by accredited degree-granting institutions, (b) professional certification organizations, and/or (c) other similar institutions widely understood to have the authority to accredit individual skills; (ii) a simple initial mapping might look something like: (a) 1,000 points for a bachelor's degree, (b) 3,000 points for a master's degree, and (c) 10,000 points for a doctorate degree; and/or (iii) adjustments could be made based on the cumulative reputation of the granting institution (for example, (a) a college or university would accumulate huge amounts of reputation and they could decide on their own system how to allocate it among their graduates, over and above the baseline described above, and/or (b) some institutions might have to adjust their endorsement allocation systems dynamically as their reputation waxed and waned).

Some embodiments of the present invention may include one, or more, of the following operations, features, characteristics and/or advantages: (i) the system is based on a permission-less or permissioned blockchain as the distributed immutable ledger of endorsement transactions; (ii) endorsement-granting institutions record their privacy-preserving endorsements publicly using existing public key infrastructure mechanisms; (iii) endorsement transactions may be either positive or negative and, in this embodiment, takes the form of unspent transaction output (UTXO) calculations (for example, tokens—but always polynomially discounted, that is, the amount of reputation change to the recipient is proportional to the square root of the absolute value of the amount allocated by the granting party); and/or (iv) there would also likely be a second compensation proportionality factor either across the entire system, within a given field, or both, in order to keep the various fields in relative balance and to ensure against credit being so deeply discounted by the square root rule that it disappears too quickly.

In one embodiment, the overall polynomial discount factor is 2 (that is, square root). The system-wide compensation factor is 3×. Discipline-specific compensation factor in the AI (artificial intelligence) field is 2×. In this example, Alice has a total reputation of 10,000 in the field of AI. Alice currently has 1,000 usable endorsement credit. Bob has a total reputation of 10 in AI. After teaching Bob, or reading a paper he wrote, Alice decides to spend 100 endorsement points on Bob. Alice's usable endorsement credit goes down from 1000 to 900. Bob's total reputation in AI goes increases by Sqrt(100)*3*2=60 to a total or 70.

Some embodiments of the present invention may include one, or more, of the following operations, features, characteristics and/or advantages: (i) continual payout: based on the total reputation credit an individual possesses at any given time, a continual amount of usable credit, optionally in the form of a second token, is made available for the individual to use for endorsing others, that is: (a) this is what is "spent", always with a polynomial discount, in order to ensure the incentive is spent frugally on individuals or corporations/institutions/etc., and/or (b) is used broadly in order to make the most efficient use of usable endorsement credit; (ii) decay rate of total reputation: any individual's or institution's total reputation in any given field will continually decay unless renewed through endorsements from others with usable reputation in that field, that is: (a) this decay rate will be a straight-line negative compound interest, (b) in general, the decay rate would be set such that no more than 10% or so would be lost in a year of no endorsements, but this percentage might vary by field in order to accommodate practices where it is necessary to stay current (for example, surgery or accounting), and/or (c) this mechanism could be used to embody a new system for ensuring currency in continuing professional education (CPE) in such fields; and/or (iii) decay rate of usable: any reputation's current usable reputation in any field will also continually decay in a similar fashion to the total reputation, and using similar guidelines to incentivize active spending.

Some embodiments of the present invention may include one, or more, of the following operations, features, characteristics and/or advantages: (i) a distributed hash table or other highly scalable non-blockchain infrastructure could be used rather than a blockchain; (ii) any e-cash system or cryptographic protocol software system used for granting tokens of value and ensuring against double-spending would suffice, as long as polynomial discounting is supported in the transactions and the system is capable of calculating current values based on published decay rates; (iii) voting: voting is also supported; (iv) in any given field or context, individuals could either be allowed to use endorsement credit directly for voting, or could have a separate pool of "voting credit" granted alongside the endorsement/reputation credit; (v) both embodiments described above could exist within the same system; (vi) determination of decay rates, voting policies, and other mechanisms of governance within each field and within the overall system could be determined by vote as described above; and/or (vii) optionally, members of a given field could decide that there is overlap between their field and others and allow cross-spending where: (a) this could be discounted at rates determined by vote as described above, and/or (b) this could entail both peer-level relationships and hierarchies of disciplines.

Some embodiments of the present invention may include one, or more, of the following operations, features, characteristics and/or advantages as described in the following example: (i) biology and medicine are related fields but neither exists in a hierarchical structure above the other; (ii) the practitioners of biology may decide that a practitioner of medicine could spend credits in biology at a 70% straight-line discount; (iii) the practitioners of biology could enable medicine experts to spend on biology at a 60% discount; and/or (iv) the incentives built into the system insure that the fields will manage the equilibrium between them.

Alternatively. some embodiments of the present invention may include one, or more, of the following operations, features, characteristics and/or advantages: (i) deep learning is a sub-discipline within machine learning; and/or (ii) individuals might seek reputation in both, but practitioners in both are likely to set up a rather shallow discounting system whereby, for example, deep learning credit could be spent on machine learning with only a 15% discount, and vice versa.

Figure 5:
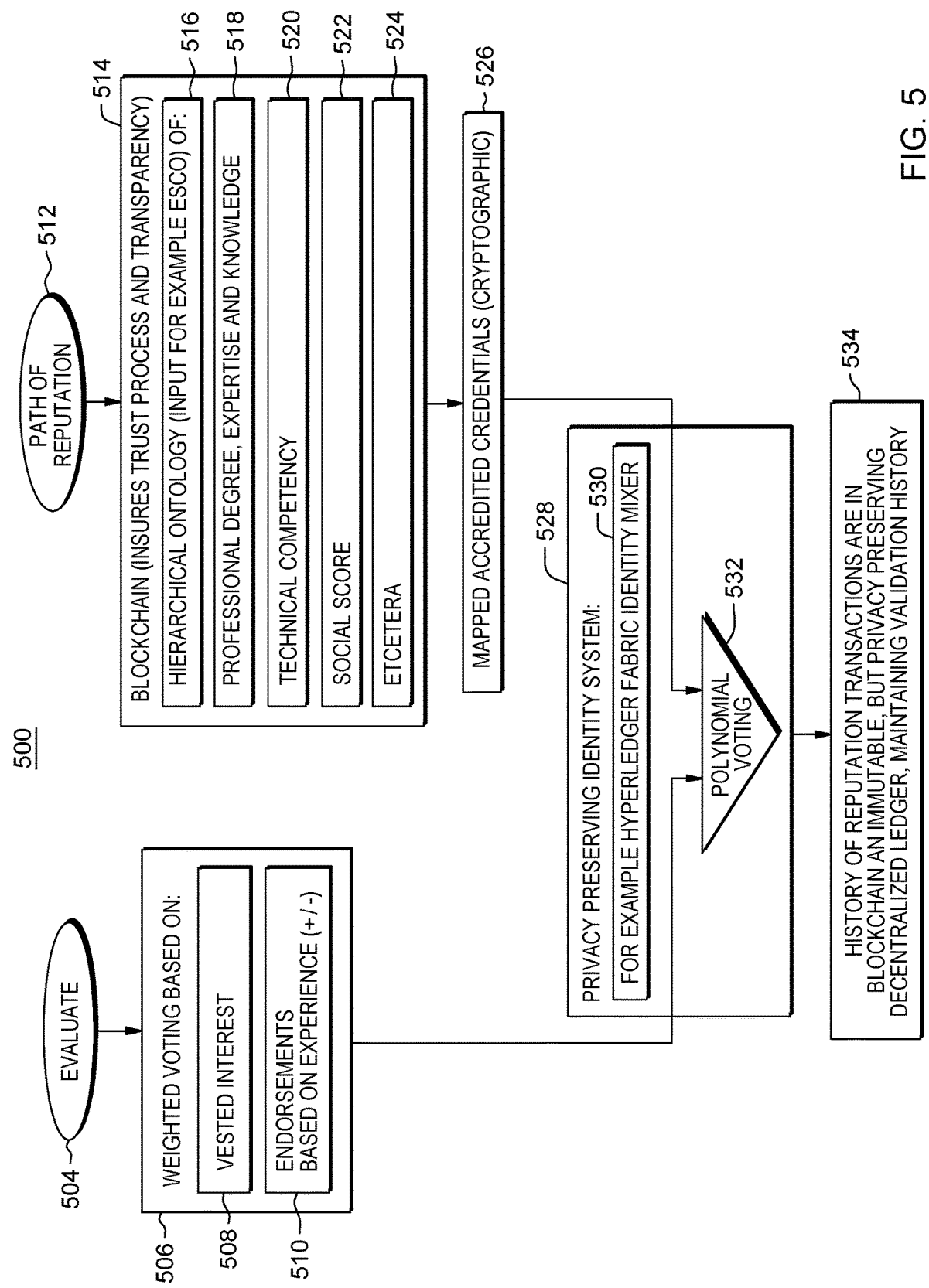
FIG. 5 is a diagram helpful in understanding various embodiments of the present invention.

As shown in FIG. 5, diagram 500 shows a privacy-preserving polynomial discounted multidisciplinary reputation and voting system. Diagram 500 includes: evaluate block 504; weighted voting based on block 506; vested interest block 508; endorsements based on experience (+/−) block 510; path of reputation block 512; blockchain (insures trust process and transparency) block 514; hierarchical ontology (input for example ESCO) of block 516; professional degree, expertise and knowledge block 518; technical competency block 520; social score block 522; etcetera block 524; mapped accredited credentials (cryptographic) block 526; privacy-preserving identity system block 528; for example Hyperledger Fabric Identity Mixer block 530; polynomial voting block 532; and history of reputation transactions are in blockchain an immutable, but privacy-preserving decentralized ledger, maintaining validation history block 534.

Some embodiments of the present invention may include one, or more, of the following operations, features, characteristics and/or advantages: (i) includes an endorsement system via a private open system: (ii) organizations, such as universities or other accredited agencies, would be able to endorse an individual just as a peer could endorse an individual: (iii) includes inherent features to govern the parameters of the system itself (for example, two different professions may use the system to endorse two different policies with respect to how current you need to be within the given profession. Carpenters may last a decade, a data scientist may be out of date with no endorsements in the last year based on the how fast the profession's knowledge is expanding); and/or (iv) within a given profession, that profession may decide how much credit can be given for a specific credential (for example, a master's degree from a top ranked university may allow a member to obtain more credit than a master's degree from a lower ranked university).

Some embodiments of the present invention may include one, or more, of the following operations, features, characteristics and/or advantages: (i) enforced anonymity and polynomial discounting disincentivizes bad faith endorsements because individual endorsements are discounted, which prevents virtue signaling (that is, nobody knows who endorsed, or how they endorsed, so there is no incentive to endorse a certain way, based on who is watching); (ii) limited credit incentivizes the user to use their endorsement on what they really care about.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   receiving a subject matter data set that includes an identification of a plurality of subjects under review;
   allocating N voting credits to a first user, where N is a positive number;
   receiving, from the first user, a vote allocation that divides at least a portion of the N voting credits among and between at least some of the subjects under review in amounts specified in the vote allocation; and
   applying the vote allocation to the at least some of the subjects under review to obtain current vote rankings for the plurality of subjects under review.

2. The CIM of claim 1 wherein the subjects under review are people.

3. The CIM of claim 2 wherein the first user is a peer with respect to the plurality of subjects under review.

4. The CIM of claim 1 further comprising:
   applying a discounting scheme to the vote allocation received from the first user so that at least some of the applied voting credits are discounted prior to applying the vote allocation to the at least some subjects under review.

5. The CIM of claim 4 wherein the discounting scheme is a polynomial voting scheme.

6. The CIM of claim 1 wherein the discounting scheme applies a discount rate that increases with the number of votes allocated to a given subject under review.

7. A computer program product (CPP) comprising:
   a set of storage device(s); and
   computer code stored collectively in the set of storage device(s), with the computer code including data and instructions to cause a processor(s) set to perform at least the following operations:

receiving a subject matter data set that includes an identification of a plurality of subjects under review, allocating N voting credits to a first user, where N is a positive number, receiving, from the first user, a vote allocation that divides at least a portion of the N voting credits among and between at least some of the subjects under review in amounts specified in the vote allocation, and applying the vote allocation to the at least some of the subjects under review to obtain current vote rankings for the plurality of subjects under review.

8. The CPP of claim 7 wherein the subjects under review are people.

9. The CPP of claim 8 wherein the first user is a peer with respect to the plurality of subjects under review.

10. The CPP of claim 7 wherein the computer code further includes instructions for causing the processor(s) set to perform the following operation(s):

applying a discounting scheme to the vote allocation received from the first user so that at least some of the applied voting credits are discounted prior to applying the vote allocation to the at least some subjects under review.

11. The CPP of claim 10 wherein the discounting scheme is a polynomial voting scheme.

12. The CPP of claim 7 wherein the discounting scheme applies a discount rate that increases with the number of votes allocated to a given subject under review.

13. A computer system (CS) comprising:

a processor(s) set;

a set of storage device(s); and computer code stored collectively in the set of storage device(s), with the computer code including data and instructions to cause the processor(s) set to perform at least the following operations:

receiving a subject matter data set that includes an identification of a plurality of subjects under review, allocating N voting credits to a first user, where N is a positive number, receiving, from the first user, a vote allocation that divides at least a portion of the N voting credits among and between at least some of the subjects under review in amounts specified in the vote allocation, and applying the vote allocation to the at least some of the subjects under review to obtain current vote rankings for the plurality of subjects under review.

14. The CS of claim 13 wherein the subjects under review are people.

15. The CS of claim 14 wherein the first user is a peer with respect to the plurality of subjects under review.

16. The CS of claim 13 wherein the computer code further includes instructions for causing the processor(s) set to perform the following operation(s):

applying a discounting scheme to the vote allocation received from the first user so that at least some of the applied voting credits are discounted prior to applying the vote allocation to the at least some subjects under review.

17. The CS of claim 16 wherein the discounting scheme is a polynomial voting scheme.

18. The CS of claim 13 wherein the discounting scheme applies a discount rate that increases with the number of votes allocated to a given subject under review.

\* \* \* \* \*